US006741684B2

(12) United States Patent
Kaars

(10) Patent No.: US 6,741,684 B2
(45) Date of Patent: May 25, 2004

(54) INTERACTIVE TV USING REMOTE CONTROL WITH BUILT-IN PHONE

(75) Inventor: Peter Bernhard Kaars, Cupertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/893,149

(22) Filed: Jun. 26, 2001

(65) Prior Publication Data

US 2003/0002638 A1 Jan. 2, 2003

(51) Int. Cl.$^7$ .................................................. H04B 1/00
(52) U.S. Cl. ............................. 379/110.01; 379/102.01; 379/102.03
(58) Field of Search ........................ 379/110.01, 93.12, 379/102.01, 102.02, 102.03, 90.01, 93.17, 93.19, 93.05; 348/554, 584, 734

(56) References Cited

U.S. PATENT DOCUMENTS

| 5,414,761 A |   | 5/1995  | Darbee   |         |
|-------------|---|---------|----------|---------|
| 5,748,716 A |   | 5/1998  | Levine   |         |
| 5,761,606 A | * | 6/1998  | Wolzien  | 725/110 |
| 6,097,441 A |   | 8/2000  | Allport  |         |
| 6,278,499 B1| * | 8/2001  | Darbee et al. | 348/734 |
| 6,285,407 B1| * | 9/2001  | Yasuki et al. | 348/554 |
| 6,466,233 B1| * | 10/2002 | Mitani   | 345/716 |

FOREIGN PATENT DOCUMENTS

| DE | 196 30 857 A | 2/1998 |
| WO | WO 9515654 A | 6/2000 |
| WO | WO 00 44168 A | 7/2000 |
| WO | WO 01 27895 A | 4/2001 |

OTHER PUBLICATIONS

US S/N 09/686,572 (US000183), Control Codes for Programmable Remote Supplied in XML Format.
US S/N 09/427,821 (PHA23786), PDA Has Wireless Modem for Remote Control Via the Internet.
US S/N 09/129,300 (PHA23470), GUI of Remote Control Facilitates User–Friendly Editing of Macros.
US S/N 09,128,839 (PHA23469), Remote Control has Animated GUI.

* cited by examiner

Primary Examiner—Melur Ramakrishnaiah
(74) Attorney, Agent, or Firm—Dicran Halajian

(57) ABSTRACT

A remote control device comprises a telephone and a touch screen functionality to enable the user to participate in interactive TV programs and interact with advertisements. This approach is independent of the infrastructure delivering traditional content, and independent of the configuration of an STB.

8 Claims, 1 Drawing Sheet

INTERACTIVE TV USING REMOTE CONTROL WITH BUILT-IN PHONE

FIELD OF THE INVENTION

Figure 1:
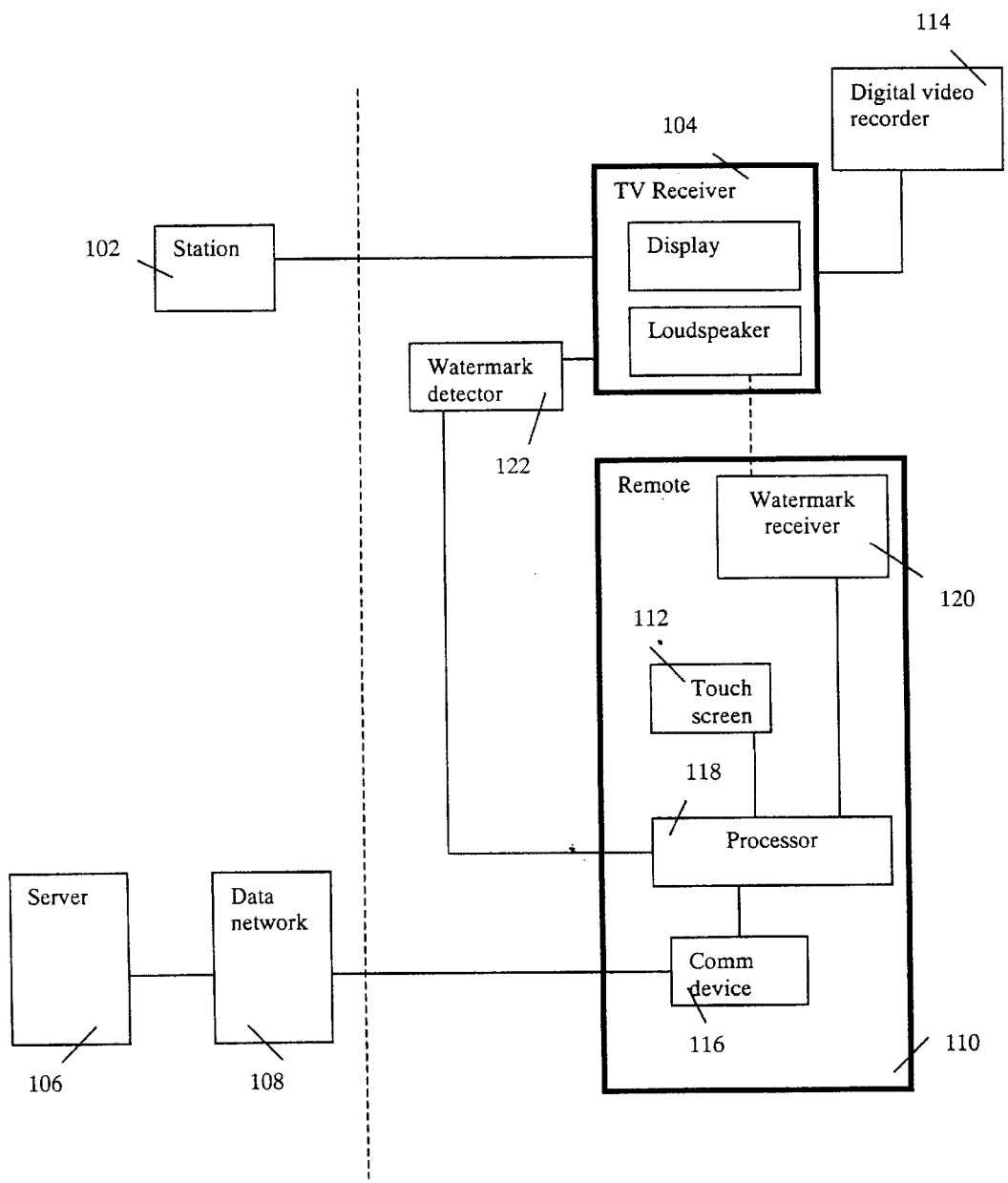

The invention relates to supplying information that has a relationship with content information being received by an end-user's consumer electronics (CE) apparatus.

BACKGROUND ART

The term "Interactive TV" (ITV) refers to enhancing TV programs with interactive services for the end-user. These services include, e.g., retrieving electronic information from, or sending electronic information to, specific Web sites via a dedicated set-top box (STB) within a context of the live-broadcast program. Examples of ITV are games for a TV audience, or interacting with an advertisement being broadcast. For example, Wink Communications provides an end-to-end system for low-cost electronic commerce on television. Their enhanced broadcasting system allows advertisers and others to create interactive enhancements to traditional TV programs. Viewers can purchase products or order brochures with a click of their remote control communicating with a STB or TV set that has the Wink client software built-in, during an enhanced program. OpenTV, Inc., provides software for STBs that enables digital interactive television for enhanced applications such as e-commerce.

SUMMARY OF THE INVENTION

ITV typically requires a dedicated infrastructure according to the specifications of the service provider, equipment manufacturer and network operator or cable provider. The inventor has realized that it is an advantage if the end-user or consumer receives the additional information related to a TV program, or a radio program, etc., without modifications being necessary to the conventional infrastructure used for supply of those programs to the end-user, including to the end-user device for receiving these programs, i.e. radios, TV sets and STBs. The inventor has also realized that the device receiving that additional information is preferably an item that is native to the home entertainment environment.

For these and other reasons, the inventor proposes to equip a remote control device (RC) with a communication apparatus such as a wireless telephone or pager, to receive the additional information from a server via a telephone network. The telephone or pager is preferably a built-in component. The RC has a display monitor that serves as a GUI. The monitor preferably has a touch screen functionality such as on the Pronto (TM) RC of Philips Electronics. The broadcast of the program causes the additional information to be sent to the RC. The additional information is displayed as, e.g., text or icons, on the GUI. User-interaction with the text or icons causes output data to be sent back via the telephone network to the server mentioned above or to another server.

Applications may need to be able to cope with the characteristic delays of the networks. Various services can be introduced on cell phones that rely on real-time or semi-real-time delivery of various data. E.g., subscribers can program a stock order system to provide an SMS alert when a stock price passes a certain value. Moreover, for accurate synchronization, watermarks can be embedded in the program. These allow, for example, that all the data required to respond to a certain event in the broadcast is already available on the RC but its rendering is triggered after the associated watermark is detected in the actual broadcast. Another method is to send data in advance and to put a time-stamp on it for its validity. Advantages are manifold. For example, interactive TV is enabled in a manner that is independent of a configuration of an STB, as the invention uses the telephone as communication medium. Further, the RC/telephone combination is independent of the STB's or TV's content delivery infrastructure (cable, satellite, etc.). TV shows or broadcast stations can fund a dedicated remote (e.g., distinguishable by the color of the housing, the ccf files controlling the GUI, the shape of the housing, etc.). The RC supports business models wherein TV shows, TV networks and stations and original content providers are revenue sources for the RC platform.

One way of implementing the synchronization between TV program and data delivery to the RC is to do everything in real-time. The current, so-called two-screen Interactive TV (watching TV while browsing the Web on a PC) uses a similar synchronization. Disney does this for "Millionaire" and MTV 2 does it with most of their programs as well.

Another way is to send messages to the phone or pager at the time that an EPG schedule indicates that a certain program is being broadcast. The phone does not need to have access to this schedule. A separate, central system interprets the EPG and triggers the relevant phones. This system needs to be aware of the differences in time in the different zones and it needs to be aware which RC-phones are present in which zones. A registration procedure may take care of this. Alternatively, cell-phone technology does have the possibility to track the geographical location of the device, e.g., through satellite based (e.g., GPS) or radio triangulation (e.g., MPS). Still another way of synchronizing is having the RC recognize the TV program. This implementation is robust against program shifts, both accidental and intended. Enabling technologies include, e.g., watermarks (embedded in the audio and/or video) and fingerprints (used to recognize the audio and/or video). The RC-phone detects the watermark, or calculates the fingerprint, calls the server, and requests instructions that match the watermark data or the fingerprint. For fingerprints in content information see, e.g., U.S. Pat. No. 5,668,603, herein incorporated by reference. Synchronizing with the playback of previously recorded content information is possible by the same mechanisms of watermarking and fingerprinting.

An aspect of the invention resides in a method of enabling a consumer to receive data under control of content information being played out at home equipment of the consumer. The content information has been supplied via a supply infrastructure, e.g., cable, satellite, etc. The method comprises supplying the data via a data network that is independent of the supply infrastructure. The data is supplied to a bi-directional telecom apparatus at the consumer, e.g., prior to the play-out of the content information or functionally simultaneously with the content being played out. The data is rendered upon the apparatus receiving a control signal caused by the content information being played out, either as streamed or received, or as played out from a recording apparatus. In an embodiment, the data is supplied by a server and is personalized according to a user profile based on an identity of the telecom apparatus. For example, the data represent instant buy buttons for products that relate to the semantic context of a TV broadcast. The buttons can be rendered on the display of the touch screen of the remote control device. In an example, the data for the buttons has been downloaded from the server on the remote for selectively being rendered upon detection of an associated watermark in the content being played out. The server downloads data for only specific ones of these buy buttons to this remote control as match the user profile. Alternatively, if all buttons have been downloaded, only specific ones are rendered under control of the watermark, as fit this user's profile. This selective rendering is achieved by, e.g., marking the data for each button as matching or conflicting.

For completeness, U.S. Pat. Nos. 5,414,761 and 5,748,716, both herein incorporated by reference, disclose an RC receiving control codes via a telephone line for being programmed into the remote's memory in the configuration phase of the remote. The remote does not have an onboard telephone or another telecom apparatus for enabling a user interactive broadcast based on operational use of the remote using typically bi-directional communication with a server within an Interactive TV context.

BRIEF DESCRIPTION OF THE EMBODIMENTS

The invention is explained in further detail below, by way of example, and with reference to the accompanying drawing, wherein FIG. 1 is a block diagram of a system in the invention.

DETAILED DESCRIPTION OF THE EMBODIMENTS

As briefly discussed above, the invention relates to a remote control device (RC) for control of home entertainment equipment. The device comprises a telephone or another telecommunication apparatus for data communication. Other mechanisms can be used that allow the RC to communicate independently of the TV infrastructure. E.g., a modem and telephone line, wireless IP connection, two-way pager, etc. The device preferably comprises a GUI with a display monitor, e.g., one that has a touch screen functionality. The data received by the telephone are rendered on the display monitor. User-interaction with the rendered data is enabled through the touch screen or RC buttons.

Preferably, the data communication or data rendering is synchronized or otherwise put into a proper temporal relationship with the TV program or radio program being broadcast or being played back after having been recorded locally at the user's equipment. Therefore, the RC device comprises a detector for detecting a control signal in the content information being played out. The control signal serves to trigger the appropriate behavior of the RC device. The control signal is, e.g., embedded in the content information as an audio watermark. The detector is then operative to detect this audio watermark. As another example, the control signal is embedded as a video watermark. The device then cooperates with a detector (e.g., accommodated in the device or accommodated in another apparatus and communicating with the RC device through a short range coupling, e.g., Bluetooth) for detecting the video watermarking signal. Note that watermarking of the content information enables to render the data communication independent of time-shifting of the content's playback through recording.

An aspect of the invention resides in having content information for being broadcast comprising a control signal for control of data communication via a telephone. This enables synchronizing the communication with the content information being played out, e.g., as a live broadcast or time-shifted through a recording at a digital recorder.

FIG. 1 is a block diagram of a system 100 in the invention. System 100 comprises a TV broadcast station 102 and a TV receiver 104 of a consumer receiving a program broadcast by station 102. The program has associated with it an interactive service that enables communication between the end-user and a server 106 via a data network 108. The end-user has available a remote control device 110. Device 110 allows the user to control his/her home equipment through IR or RF. Device 110 preferably has a display monitor 112 with touch screen functionality. Device 110 comprises, e.g., a Pronto (™) universal programmable remote control device as manufactured by Philips Electronics. In the control mode of device 110, monitor 112 presents icons with which the user interacts through the touch screen. Interaction with an icon causes device 110 to send a specific IR or RF control command to the associated CE equipment, e.g., receiver 104 or a digital video recorder 114, or another CE apparatus. Device 110 accommodates a telecommunications device 116, e.g., a cell phone or a pager, to enable data communication with server 106 via network 108. In a data communication mode of device 110, the data communicated from server 106 is processed by processor 118 and rendered on screen 112, e.g., as text and/or icons and/or another graphics representation. Selection of an item rendered is accomplished through user-interaction with touch screen 112. The user-interaction causes data to be sent back to server 106. Device 110 has an audio watermark receiver 120. Receiver 120 detects a specific audio watermark embedded in the audio part of the content played out (live or from recorder 114) at TV receiver 104. The watermark is used to control the data communication with server 106. For example, during the play-out of a specific part of content information, receiver 120 detects a specific watermark The watermark detected is processed by processor 118 that extracts a request to retrieve certain information from server 106. The request may be as little as a pointer to a specific piece of information, depending on the program broadcast. For example, processor 118 has received a look-up-table from server 106 that translates the watermark into a pointer. The request is sent via phone 116 to server 106. The latter thereupon sends the information to phone 116 that passes it on to processor 118. The information is processed and rendered on screen 112 under control of processor 118. In this manner, the information supply via network 108 and the play-out of the content are synchronized under control of the watermark embedded in the content. A video watermark 122 can be used in addition to, or instead of, audio watermark detector 120, but may be less practical when accommodated in remote 110 because of the line of sight needed between the display of TV receiver 104 and detector 122. Video watermark detector 122 is built-in or added to TV receiver 104 and communicates with remote 110 using a short range RF communication protocol, e.g., Bluetooth. Processor 118 then controls communication device 116 in a manner similar to the one discussed above with respect to the audio watermark.

In an embodiment of the invention, telephone 110 has been registered as owned by this specific user. Together with the request extracted from the watermark, phone 116 sends a unique identifier to server 106. Accordingly, server 106 can distinguish between different users and can adapt the supply of information accordingly.

In a further embodiment of the invention, the information supplied by server 106 comprises advertisements for goods or services that fit in with the semantic context of the content information being played out. For example, a specific scene of a movie being played out via the user's equipment takes place in a certain geographic environment. This scene comprises a watermark. Detection of the watermark causes telephone 116 to contact server 106, that in turn sends an advertisement for a vacation in that environment. The advertisement is displayed on the RC's screen. An interested user can, e.g., respond to request additional information by mail, or save the text for studying it later in more detail. As another example, the information supplied by server 106 concerns information on merchandise that can be related to the broadcast. Processor 118 and the GUI on Screen 112 provide the option to buy it directly by sending the user's response to Server 106. As still another example, assume that the content played out is a live broadcast. The information supplied by server 106 contains background information about the events being broadcast. This information may have been prepared in advance or has been compiled in real-time by an editor at the studio. The watermark now is being used as a synchronizing mechanism.

Note that the relationship between a watermark and the information caused to be supplied by server 106 when the mark is detected, is preferably modifiable, dynamic or personalized. For example, server 106 may keep a log of what has been supplied to this specific user on previous occasions. In this manner, the information can be different each time the user responds to the same content. If server 106 has a profile of this user, the information can be customized and tailored to the specific profile.

Incorporated by reference herein

U.S. Ser. No. 09/686,572 (attorney docket US 000183) filed Oct. 10, 2000 for Tom Dubil et al., for CONTROL CODES FOR PROGRAMMABLE REMOTE SUPPLIED IN XML FORMAT. This document relates to an Internet service that control codes available for use on a programmable universal remote. The remote controls CE equipment through IR or RF commands. A server supplies the control codes as XML data that gets processed at the receiver's set top box or PC, or the remote itself, for being properly installed on the remote.

U.S. Ser. No. 09/427,821 (attorney docket PHA 23,786) filed Oct. 27, 1999 for Joost Kemink et al., for PDA HAS WIRELESS MODEM FOR REMOTE CONTROL VIA THE INTERNET. This document relates to combining a PDA with a wireless modem to enable remote control of CE equipment via the Internet and a local home server.

U.S. Ser. No. 09/128,839 (attorney docket PHA 23,469) filed Aug. 4, 1998 for Jan van Ee et al., for REMOTE CONTROL HAS ANIMATED GUI. This document relates to a remote control device for remote control of home theater equipment. The device has a display with a touch screen representing a GUI. User-activation of the GUI causes its appearance to change. The change is effected through animation. Animation is the simulation of movement created by displaying a series of bitmaps. The animation lets the user perceive the change as a smooth transition. Thus the impression is avoided of an abrupt confrontation with a new lay-out.

U.S. Ser. No. 09/129,300 (attorney docket PHA 23,470) filed Aug. 5, 1998 for Jan van Ee et al., for GUI OF REMOTE CONTROL FACILITATES USER-FRIENDLY EDITING OF MACROS. This document relates to a remote control device for a home theater. The device has a macro creation/editing mode with authoring tools on the remote's GUI. One of the editing tools lets the user move a selected macro step visibly up or down the list of steps on the GUI.

What is claimed is:

1. A standalone remote control device for control of home entertainment equipment that receives content from a first infrastructure for delivery of content the equipment, the standalone device comprising a telecom device for bi-directional communication of data via a second infrastructure for delivery of data related to the content delivered to the entertainment equipment via the first infrastructure, the telecom device of the standalone device communicating via the second infrastructure separately from the home entertainment equipment, the standalone device including a display monitor for the rendering of the data delivered from the second infrastructure.

2. The device of claim 1, wherein the communication is controlled by a control signal in the content.

3. The device of claim 1, wherein the telecom device comprises at least one of the following: a telephone, a pager.

4. The device of claim 1, comprising a GUI with touch screen functionality.

5. The device of claim 1, comprising a detector for detecting a signal in the content when played out via the equipment the signal being used for controlling a rendering at the device of the data received.

6. A method of enabling a consumer to receive data under control of content information being played out at home equipment of the consumer and having been supplied vie a supply infrastructure, the method comprising:

supplying the data via a data network, independent of the supply infrastructure and the home equipment, to a standalone bi-directional telecom device at the consumer, the standalone device including a user interface and display monitor; and enabling the standalone device to render the data after the device receives a control signal caused by the content information being played out on the home equipment.

7. The method of claim 6, wherein the data comprises graphics information when rendered.

8. The method of claim 6, comprising personalizing the data according to a user-profile based on an identity of the telecom device.

* * * * *